United States Patent
Stevens et al.

(10) Patent No.: US 10,479,531 B2
(45) Date of Patent: Nov. 19, 2019

(54) SHELL ROTOR ASSEMBLY FOR USE IN A CONTROL MOMENT GYROSCOPE AND METHOD OF MAKING THE SAME

(75) Inventors: Carlos J. Stevens, Peoria, AZ (US); Mark Heller, Phoenix, AZ (US); Stephen Edward Fiske, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 1876 days.

(21) Appl. No.: 12/862,329

(22) Filed: Aug. 24, 2010

(65) Prior Publication Data
US 2012/0048040 A1    Mar. 1, 2012

(51) Int. Cl.
*G01C 19/06*  (2006.01)
*B64G 1/28*  (2006.01)

(52) U.S. Cl.
CPC .......... *B64G 1/286* (2013.01); *Y10T 74/1296* (2015.01)

(58) Field of Classification Search
CPC ....... B64G 1/286; B64G 1/28; Y10T 74/1296; Y10T 74/1254; Y10T 74/12; F16F 15/30; G01C 19/02; G01C 19/06
See application file for complete search history.

(56) References Cited

U.S. PATENT DOCUMENTS

| | | | |
|---|---|---|---|
| 1,898,663 A * | 2/1933 | Hodgkinson | F16M 5/00 74/5 R |
| 2,805,578 A * | 9/1957 | Gordon | G01C 19/42 188/83 |
| 3,043,147 A | 7/1962 | Will, Jr. | |
| 3,286,109 A * | 11/1966 | Madsen | H02K 37/18 310/49.32 |
| 3,742,769 A | 7/1973 | Crutcher et al. | |
| 3,822,602 A | 7/1974 | Holmes et al. | |
| 3,851,933 A | 12/1974 | Jacobson | |
| 4,068,533 A * | 1/1978 | Ferriss | G01C 19/28 310/90.5 |
| 4,211,452 A | 7/1980 | Poubeau | |
| 4,242,917 A * | 1/1981 | Bennett et al. | 74/5.5 |
| 5,087,415 A * | 2/1992 | Hemphill et al. | 420/95 |
| 5,150,625 A | 9/1992 | Mishler | |
| 5,213,436 A * | 5/1993 | Fichtner et al. | 403/220 |
| 5,386,738 A | 2/1995 | Havenhill | |
| 5,419,212 A | 5/1995 | Smith | |
| 6,044,726 A | 4/2000 | Blake | |

(Continued)

FOREIGN PATENT DOCUMENTS

GB    717349    * 10/1954
JP    2009186477 A    8/2009

OTHER PUBLICATIONS

Define zone—Google Search, google.com., Apr. 24, 2017.*

(Continued)

*Primary Examiner* — Vinh Luong
(74) *Attorney, Agent, or Firm* — Lorenz & Kopf, LLP

(57) ABSTRACT

A shell rotor assembly for use in a control moment gyroscope herein. The shell rotor assembly includes, but is not limited to, a first shell member having a first wall portion and a first rim portion formed integrally with one another and a second shell member having a second wall portion and a second rim portion formed integrally with one another. The first rim portion and the second rim portion are attached to one another.

3 Claims, 6 Drawing Sheets

(56) References Cited

U.S. PATENT DOCUMENTS

| | | | |
|---|---|---|---|
| 7,000,308 B2 | 2/2006 | Fiske et al. | |
| 2003/0140479 A1 | 7/2003 | Fiske et al. | |
| 2005/0101454 A1* | 5/2005 | Dworzan | A63B 21/22 482/110 |
| 2007/0177316 A1* | 8/2007 | Hotelling et al. | 361/51 |
| 2009/0100957 A1* | 4/2009 | Winkel | B64G 1/283 74/5 R |
| 2009/0200428 A1* | 8/2009 | Smith | B64G 1/286 244/165 |
| 2010/0000349 A1 | 1/2010 | Stevens et al. | |
| 2010/0064828 A1 | 3/2010 | Gisler et al. | |
| 2011/0283826 A1* | 11/2011 | Davis | 74/5 R |
| 2012/0057938 A1* | 3/2012 | Tanguay et al. | 405/219 |
| 2016/0010991 A1* | 1/2016 | Marshall | B64G 1/283 74/5.37 |

OTHER PUBLICATIONS

Define area—Google Search, google.com., Apr. 24, 2017.*
Define rim—Google Search, google.com., Apr. 24, 2017.*
Define electron beam welding—Google Search, google.com., Apr. 24, 2017.*
Define backstop, Google Search, google.com., May 13, 2018.*
Define welding, Google Search, google.com., May 13, 2018.*
Define fatigue stress—Google Search, Nov. 24, 2018 (Year: 2018).*
Fatigue Testing—Google Search, Nov. 23, 2018 (Year: 2018).*
Define heat affected zone—Google Search, Nov. 23, 2018 (Year: 2018).*
Stainless steel—Wikipedia, wikipedia.org., Mar. 17, 2019. (Year: 2019).*
EP Summons to Attend Oral Proceedings Pursuant to Rule 115(1)EPC dated Mar. 15, 2016.
EP Examination Report for Application No. 11177611.8, Dated Jun. 12, 2014.
JP Office Action for Application No. JP 2011-179731; Dated Jan. 14, 2016.
JP Office Action for Application No. JP 2011-179731; Dated Jun. 24, 2015.
EP Search Report, EP 11177611.8-2422 dated Dec. 29, 2011.
EP Communication, EP 11177611.8-2422 dated Jan. 11, 2012.
EP Communication for Application No. 11 177 611.8-1754 dated Nov. 30, 2016.

* cited by examiner

SHELL ROTOR ASSEMBLY FOR USE IN A CONTROL MOMENT GYROSCOPE AND METHOD OF MAKING THE SAME

TECHNICAL FIELD

The present invention generally relates to a control moment gyroscope, and more particularly relates to a shell rotor assembly for use in a control moment gyroscope and a method for making the same.

BACKGROUND

Gyroscopes are spinning bodies, such as wheels or discs that generate angular momentum as they spin about an axis. One common application has been to use gyroscopes to control the movement of spacecraft operating in a weightless environment, such as that encountered while in orbit around the earth. The attitude of a spacecraft can be controlled by selectively changing the direction of the gyroscope spin axis relative to the spacecraft. As described by the law of conservation of angular momentum, this change in the angular momentum vector of the gyroscope will in turn create an opposite but equal change in the angular momentum vector of the spacecraft. This torque, in turn, causes the spacecraft to rotate. Utilizing this principle to change the momentum of a spacecraft is much more power efficient than simply reacting the torque of a motor against a spinning body such as in a reaction wheel. Gyroscopes that are used for this purpose are known as control moment gyroscopes (hereinafter "CMG").

A CMG commonly includes a shell rotor assembly, one or more motors for spinning the shell rotor assembly, and a housing assembly to house the shell rotor assembly and the motors. The housing assembly is designed and constructed to mount the shell rotor assembly in a manner that permits the shell rotor assembly to spin with respect to the housing assembly. It should be understood that not all CMGs use a rotor having a shell configuration, and that other configurations may also be employed.

The shell rotor assembly commonly has a shell configuration having two opposing bowl-shaped shell members, a rim having an annular configuration attached to the periphery of the two shell members, and a shaft that extends through the center of the two shell members at an angle that is perpendicular to the rim. The primary purpose of the two shell members is to mount the rim to the shaft in a structurally stable manner. The shaft's primary purpose is to serve as an axle that rotatably connects the shell rotor assembly to the housing via support bearings. The rim's primary purpose is to provide a highly concentrated mass for the shell rotor assembly.

Based on the law of conservation of angular momentum, the torque applied to a spacecraft by a CMG is proportional to the angular momentum of the spinning shell rotor assembly and the rate at which the direction of the spin axis is changed. The angular momentum of the shell rotor assembly is a function of its rotating inertia (mass and size) and the speed at which it's spinning. The faster the shell rotor assembly spins the greater the angular momentum and hence, potential torque applied to a spacecraft. Similarly, the more inertia a shell rotor assembly has as it spins, the greater the angular momentum and resulting applied torque capability. Accordingly, if the inertia (i.e. mass and/or size) of the shell rotor assembly is decreased, then the speed at which the shell rotor assembly spins must be increased in order to maintain the same angular momentum and resulting torque capability. Because CMGs are primarily used on spacecraft and because weight and bulk are major considerations when launching spacecraft into orbit, it is preferable to reduce both the CMG's mass and size. Such downsizing requires an increase in rotational speed of the shell rotor assembly in order to maintain the CMG's performance capabilities.

One limitation on increasing the rotational speed of the shell rotor assembly is the shell rotor assembly's structural ability to tolerate the forces and stresses of high speed rotation. The shell rotor assembly essentially consists of solid metal components and weld joints joining the solid metal components to one another. A weld joint is, by its very nature, weaker than either of the solid metal components that it joins. Accordingly, the speed at which a conventional shell rotor assembly can rotate before structural failure will occur is limited by the strength of its weld joints. Therefore, the maximum speed of the shell rotor assembly will be limited by the strength of the weld joint that is most susceptible to failure. The weld joint that is most susceptible to failure is the weld joint that experiences the greatest amount of stress. It has been observed that the weld joints on a conventional shell rotor assembly that experience the greatest amount of stress are the weld joints that join the shell members to the rim. Accordingly, the extent to which a conventional shell rotor assembly can be downsized without compromising its performance is limited by the strength of the weld joints between the shell members and the rim.

BRIEF SUMMARY

Various embodiments of a shell rotor assembly for use in a control moment gyroscope and various embodiments of a method for making a shell rotor assembly for use with a control moment gyroscope are disclosed herein.

In a non-limiting embodiment, the shell rotor assembly includes, but is not limited to, a first shell member having a first wall portion and a first rim portion formed integrally with one another and a second shell member having a second wall portion and a second rim portion formed integrally with one another. The first rim portion and the second rim portion are attached to one another.

In another non-limiting embodiment, the shell rotor assembly includes, but is not limited to, a first shell member having a first wall portion and a first rim portion formed integrally with one another. The first rim portion includes a first alignment feature. A second shell member has a second wall portion and a second rim portion formed integrally with one another. The second rim portion includes a second alignment feature configured to engage the first alignment feature. The second alignment feature is engaged with the first alignment feature. The first shell member and the second shell member are arranged concentrically with one another as a result of engagement between the first alignment feature and the second alignment feature. The first rim portion and the second rim portion are attached to one another.

In another non-limiting embodiment, the method for making a shell rotor assembly includes, but is not limited to, heating a first metal disc. The method further includes pressing the first metal disc to form a first generally bowl shaped member. The method further includes removing material from the first generally bowl shaped member to form a first shell member having a relatively thin first wall and a relatively thick first rim portion. The method further includes heating a second metal disc. The method further includes pressing the second metal disc to form a second generally bowl shaped member. The method further includes removing material from the second generally bowl shaped member to form a second shell member having a relatively thin second wall and a relatively thick second rim portion. The method further includes aligning the first shell member concentrically with the second shell member such that the first rim portion engages the second rim portion. The method further includes attaching the first rim portion to the second rim portion.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

An improved shell rotor assembly is disclosed herein for use in a CMG. On the shell rotor assembly taught herein, the weld joints between the shell members and the rim have been eliminated. This is because the present shell rotor assembly does not have a rim that starts out as a separate and discrete component from the shell members. Rather, on the shell rotor assembly taught herein, each shell member includes an integrated rim portion. The rim portion and the shell member are integral and contiguous with one another because they are formed from a single, continuous piece of metal (or other suitable material). Therefore, there is no discontinuity of material throughout the component. The respective rim portions of each shell member are joined to one another, e.g., via a weld joint, to form a shell-shaped shell rotor assembly having a rim assembly around its periphery. This construction reduces the number of components which must be joined and hence reduces the overall complexity of the shell rotor assembly. Additionally, the weld joints on the prior art rotors that joined the rim to the shell members were located at areas of extremely high stress fatigue. The weld joint that joins the two shell members of the rotor described herein, however, locates the weld joint in an area that has a relatively low fatigue stress.

A greater understanding of the embodiments of the shell rotor assembly for use in a control moment gyroscope and the methods for making the shell rotor assembly may be obtained through a review of the illustrations accompanying this application together with a review of the detailed description that follows.

Figure 1:
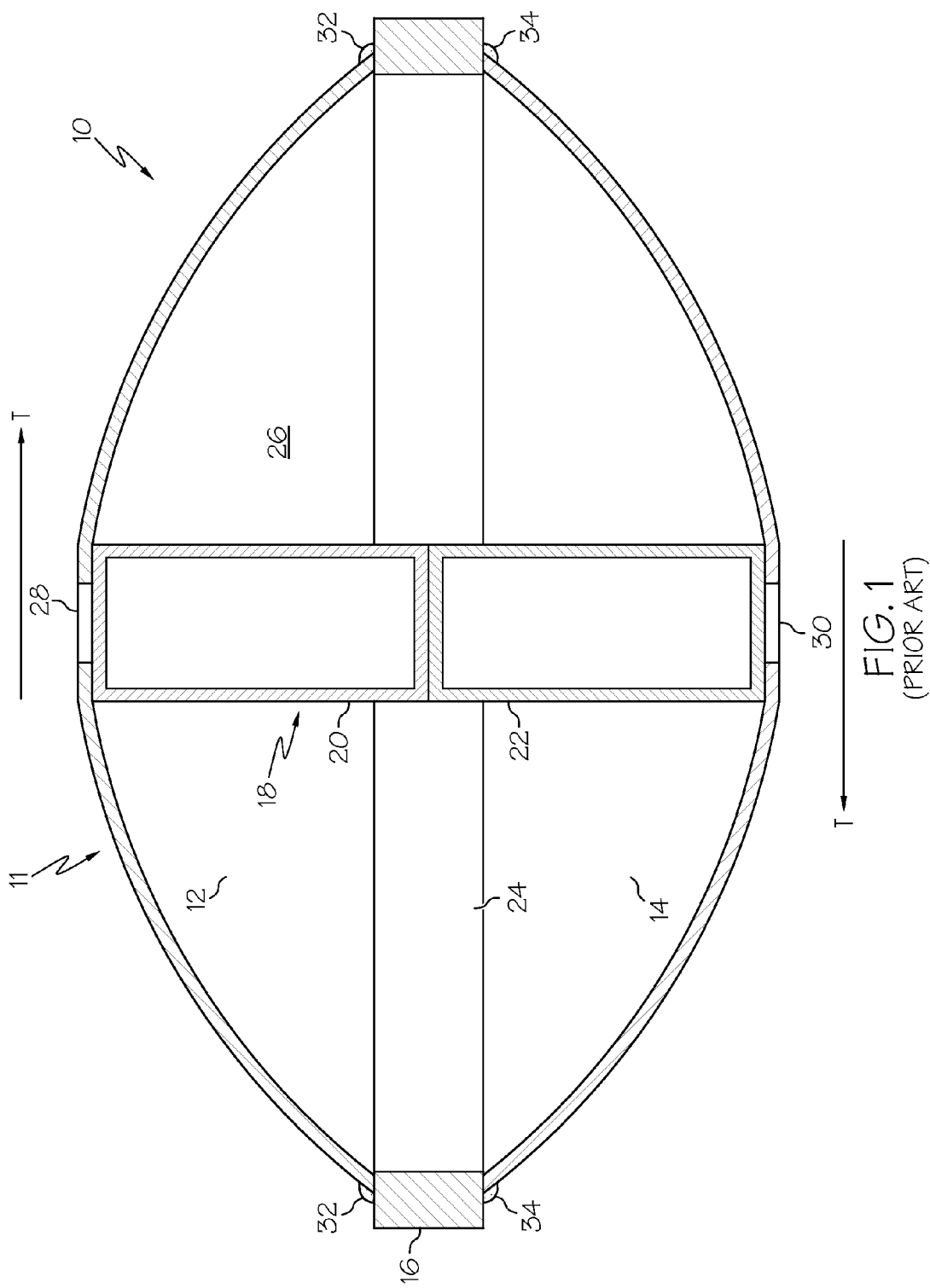
FIG. 1 is a simplified cross sectional view illustrating a prior art shell rotor assembly for use in a control moment gyroscope.

FIG. 1 is a simplified cross sectional view illustrating a prior art shell rotor assembly 10 for use in a control moment gyroscope (not shown). Prior art shell rotor assembly 10 includes a shell assembly (that includes a first shell member 12 concentrically arranged with a second shell member 14), a rim member 16, and a shaft assembly 18 (that includes a first shaft member 20 and a second shaft member 22). Rim member 16 is a ring-like or annular structure that forms the periphery of prior art shell rotor assembly 10. Rim member 16 is commonly fabricated from a metal material such as steel and typically has a relatively large mass as compared with the remainder of prior art shell rotor assembly 10.

Shell assembly 11 connects rim member 16 to shaft assembly 18. An area 26 between first shell member 12 and second shell member14 is largely or entirely hollow. The primary purpose of shell assembly 11 is to provide a structurally robust connection between shaft assembly 18 and rim member 16, one which can tolerate the high stresses of the torque applied to the spacecraft via the shaft assembly 18 as the spacecraft is maneuvered. In some embodiments, first shell member 12 and second shell member 14 may have an undulating or cratered surface that acts as one or more structural ribs or buttresses to provide shell assembly 11 with greater strength and resilience to torque and other stresses. First shell member 12 and second shell member 14 include an opening 28 and an opening 30, respectively, to provide access to shaft assembly 18 and thereby provide a means by which prior art shell rotor assembly 10 may be rotatably mounted to a housing (not shown) of a CMG. In some embodiments, a portion of shaft assembly 18 may protrude through openings 28 and 30 to facilitate connection to a housing or machinery used to spin prior art shell rotor assembly 10.

Shaft assembly 18 is disposed at an approximate center of prior art shell rotor assembly 10 and extends between first shell member 12 and second shell member 14. Shaft assembly 18 serves as an axle that supports prior art shell rotor assembly 10 as it spins. In this capacity, when a CMG applies torque T to the space craft, that torque is transferred from the prior art shell rotor assembly through shaft assembly 18 which then transmits it to shell assembly 11 and rim member 16. Shaft assembly 18 also supports first shell member 12 and second shell member 14, preventing the two shell members from collapsing towards one another as prior art shell rotor assembly 10 spins.

First shell member 12 is attached to rim member 16 via a first weld joint 32. First weld joint 32 may extend around an entire periphery of first shell member 12. Similarly, second shell member 14 is attached to rim member 16 via weld joint 34 that may extend around an entire periphery of second shell member 14.

Configured in the manner illustrated in FIG. 1, first and second weld joints 32 and 34 are located where the greatest stress develops when torque T is applied to prior art shell rotor assembly 10. The force of torque T is transferred from shaft assembly 18 down through the walls of first and second shell members 12 and 14 to rim member 16. When the force of torque T reaches rim member 16, it acts as a shearing force on first and second weld joints 32 and 34. Furthermore, during rotation, first and second weld joints 32 and 34 are again located at the area where the greatest amount of stress develops. This is because rim member 16, which spins faster than any other component on prior art shell rotor assembly 10 due to its distance from shaft assembly 18, will undergo expansion. The faster that prior art shell rotor assembly 10 spins, the greater this expansion will be. As rim member 16 expands, first and second weld joints 32 and 34 will again experience a shearing force. Because a welded joint is weaker than the inherent material that is joined together by the weld joint, first and second weld joints 32 and 34 are relative weak points on prior art shell rotor assembly. Because first and second weld joints 32 and 34 are located at the region of highest stress, they are the weakest points on prior art shell rotor assembly 10. Thus, the strength of first and second weld joints 32 and 34 constitutes a limitation on the maximum rotational speed of prior art shell rotor assembly. This limitation could be eliminated if these welded joints were replaced with a shell and rim that are contiguous with one another, i.e., fabricated from a single piece of metal.

Figure 2:
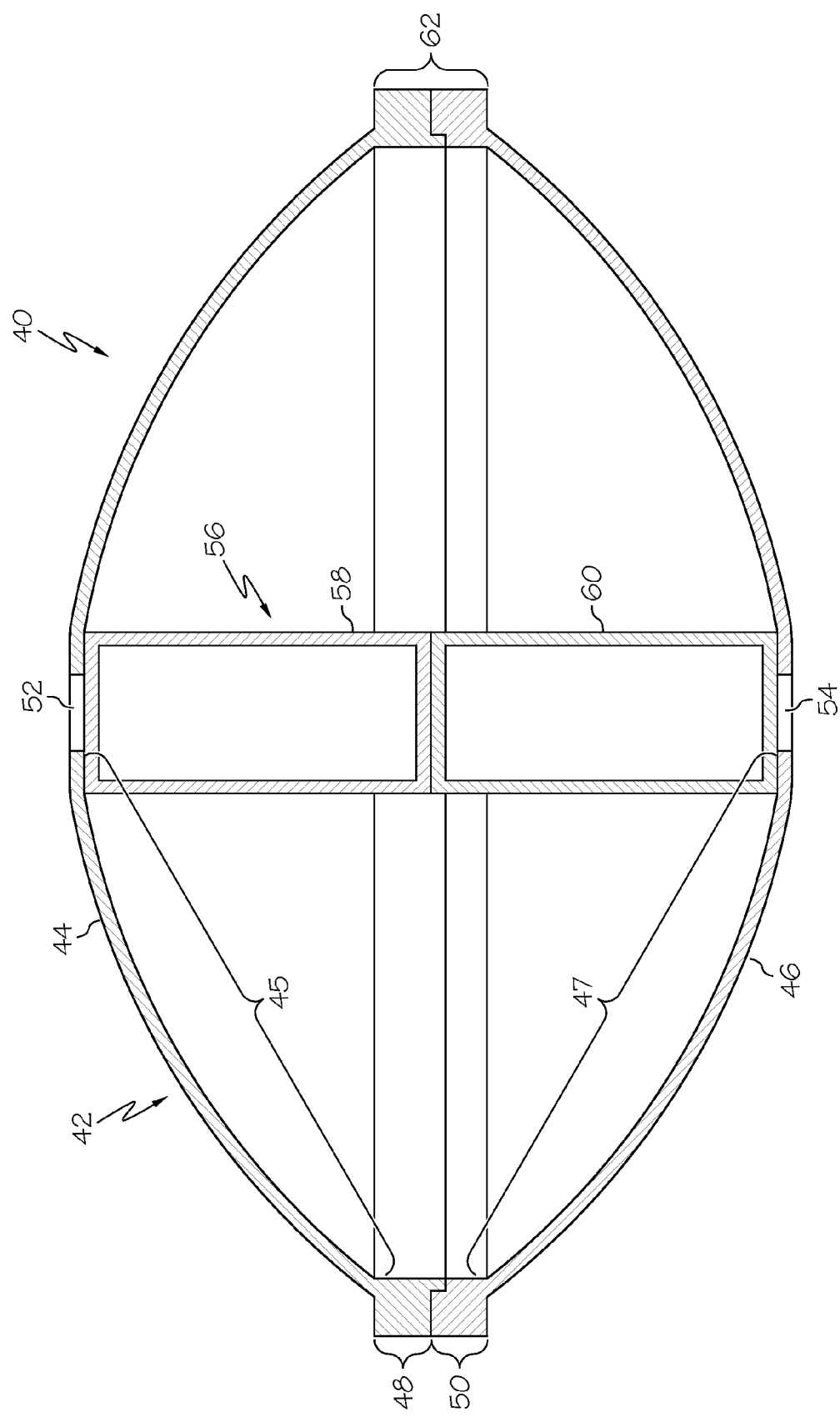
FIG. 2 is a simplified cross sectional view illustrating an embodiment of a shell rotor assembly made in accordance with the teachings herein for use in a control moment gyroscope.

FIG. 2 is a simplified cross sectional view illustrating an embodiment of a shell rotor assembly 40 made in accordance with the teachings herein for use in a CMG. Shell rotor assembly 40 includes a shell assembly 42 and a shaft assembly 56. Shell assembly 42 includes a first shell member 44 and a second shell member 46 that are concentrically arranged with respect to one another and that are attached to each other.

First shell member 44 includes a first wall portion 45, first rim portion 48 and a first opening 52. First wall portion 45 and first rim portion 48 are integral with one another, i.e., first wall portion 45 and first rim portion 48 comprise a single, contiguous component. Similarly, second shell member 46 includes a second wall portion 47 integral with a second rim portion 50. Second shell member 46 also has a second opening 54.

In some embodiments, first shell member 44 and second shell member 46 may have started out as uniformly thick metal blanks and, through machining, may have been thinned out to form wall portions and rim portions. In other embodiments, the shell members may be die cast from molten metal. Other methods of manufacture that are effective to form the shell members from a single piece of metal (or other material) that have a relatively thin wall portion and a relatively thick rim portion may also be employed without departing from the teachings herein.

Shaft assembly 56 includes a first shaft member 58 and a second shaft member 60 that are longitudinally arranged to extend between first shell member 44 and second shell member 46. As used herein, the term "longitudinal" shall refer to a direction parallel to shaft assembly 56 and the term "lateral" shall refer to a direction perpendicular to shaft assembly 56. Shaft assembly 56 serves as an axle for shell rotor assembly 40 and may be connected to a CMG through first and second openings 52 and 54.

First shell member 44 and second shell member 46 are attached to one another at their respective rim portions. First rim portion 48 and second rim portion 50 may be attached to one another via any suitable means effective to provide a robust attachment between first and second shell members 44 and 46, including but not limited to, welding. Once attached, first rim portion 48 and second rim portion 50 form rim assembly 62 which forms a periphery of shell rotor assembly 40.

With continuing reference to FIGS. 1 and 2, shell rotor assembly 40 is visually similar to prior art shell rotor assembly 10. Both have a rounded shell surrounded by a relatively thick rim. However, unlike prior art shell rotor assembly 10, shell rotor assembly 40 does not have weld joints at the point where the shell wall meets the rim portion. Rather, shell rotor assembly 40 provides a strong and durable connection in the form of contiguous, uninterrupted inherent material between the rim and the shell. This robust connection allows shell rotor assembly 40 to spin at a faster rate than prior art shell rotor assembly 10.

Figure 3B:
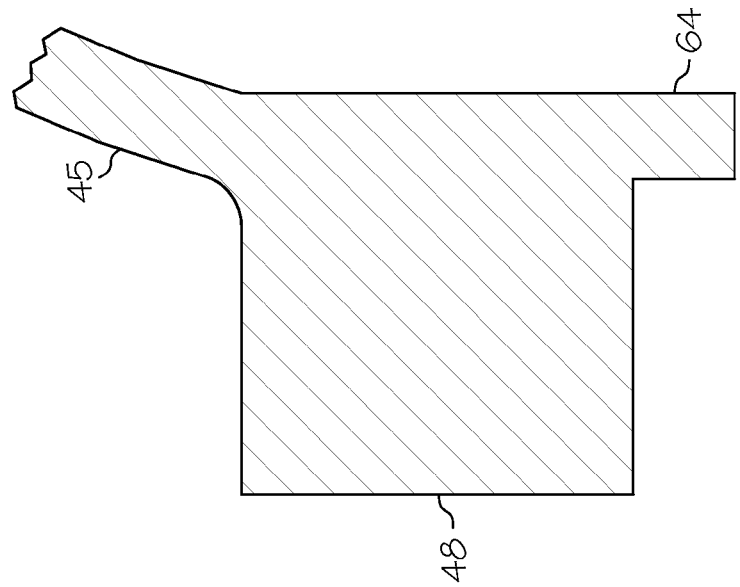
FIG. 3B is a fragmentary cross sectional view taken along the line 3-3 of FIG. 3A.
Figure 3A:
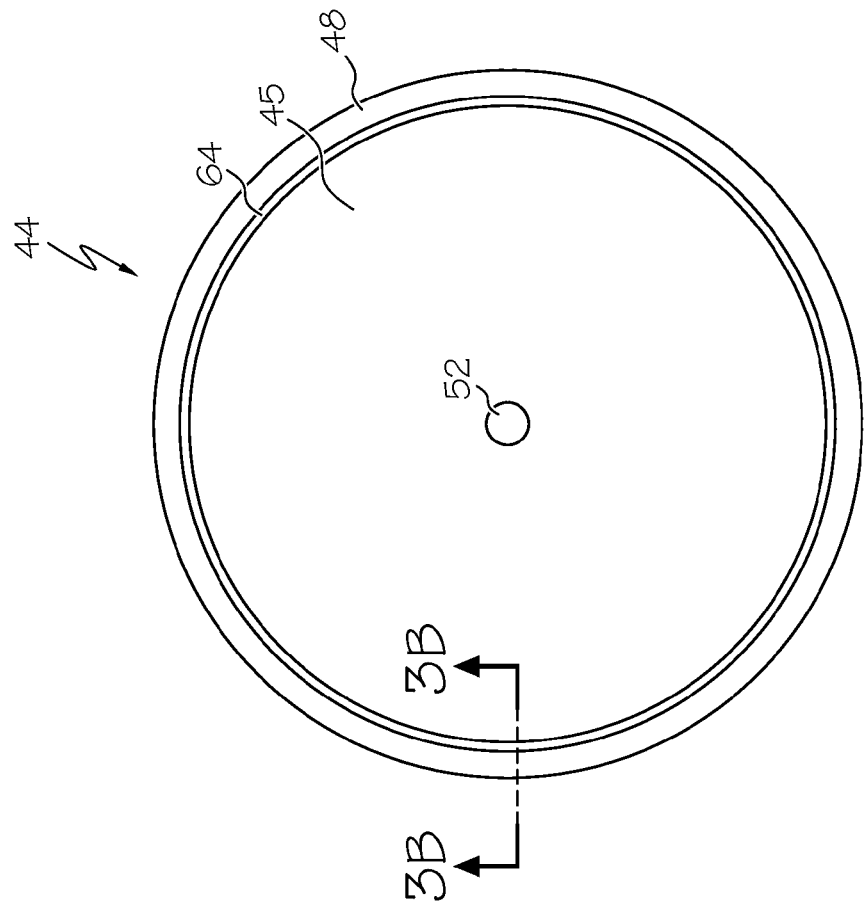
FIG. 3A is a bottom view illustrating a shell member that forms an upper portion of the shell rotor assembly of FIG. 2.

FIG. 3A is a bottom view illustrating first shell member 44. This view is taken from a perspective underneath first shell member 44 looking up. In this view, a laterally extending bottom surface of first rim portion 48 and a laterally extending bottom surface of first wall portion 45 are visible. Also visible in FIG. 3A is a first alignment feature 64.

With continuing reference to FIGS. 2 and 3A, first alignment feature 64 may be used to ensure that first shell member 44 and second shell member 46 are aligned concentrically with respect to one another before they are welded together or otherwise attached. In the embodiment illustrated in FIG. 3A, first alignment feature 64 extends around an entire circumference of first shell member 44. In other embodiments, first alignment feature 64 may extend only partially around a circumference of first shell member 44 or may comprise a plurality of members spaced apart about the lateral surface of first rim portion 48. In the illustrated embodiment, first alignment feature 64 is a step that extends beyond the lateral surface of first rim portion 48 to engage with a corresponding alignment member on second rim portion 50. In other embodiments, any other suitable structure, member, and/or configuration effective to concentrically align first shell member 44 with second shell member 46 may also be employed.

FIG. 3B is a fragmentary cross sectional view taken along the line 3-3 of FIG. 3A. In this view, first alignment feature 64 can be seen extending beyond a bottom surface of first rim portion 48.

Figure 4B:
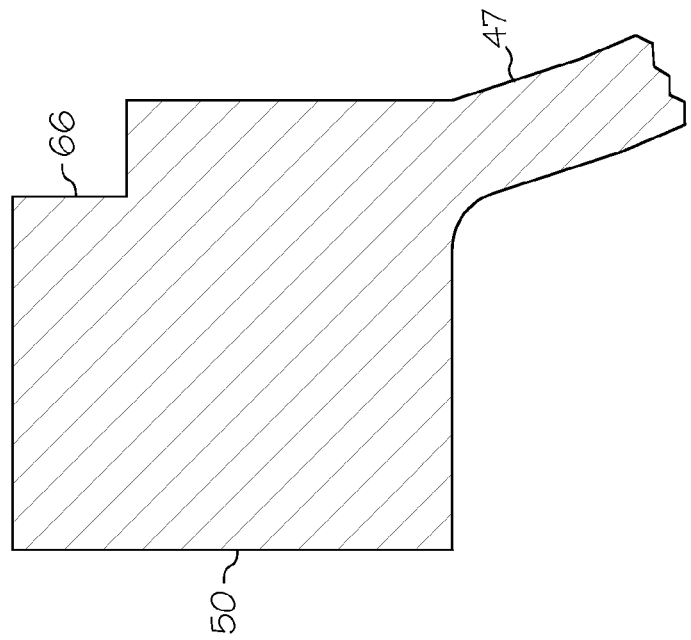
FIG. 4B is a fragmentary cross sectional view taken along the line 4-4 of FIG. 4A.
Figure 4A:
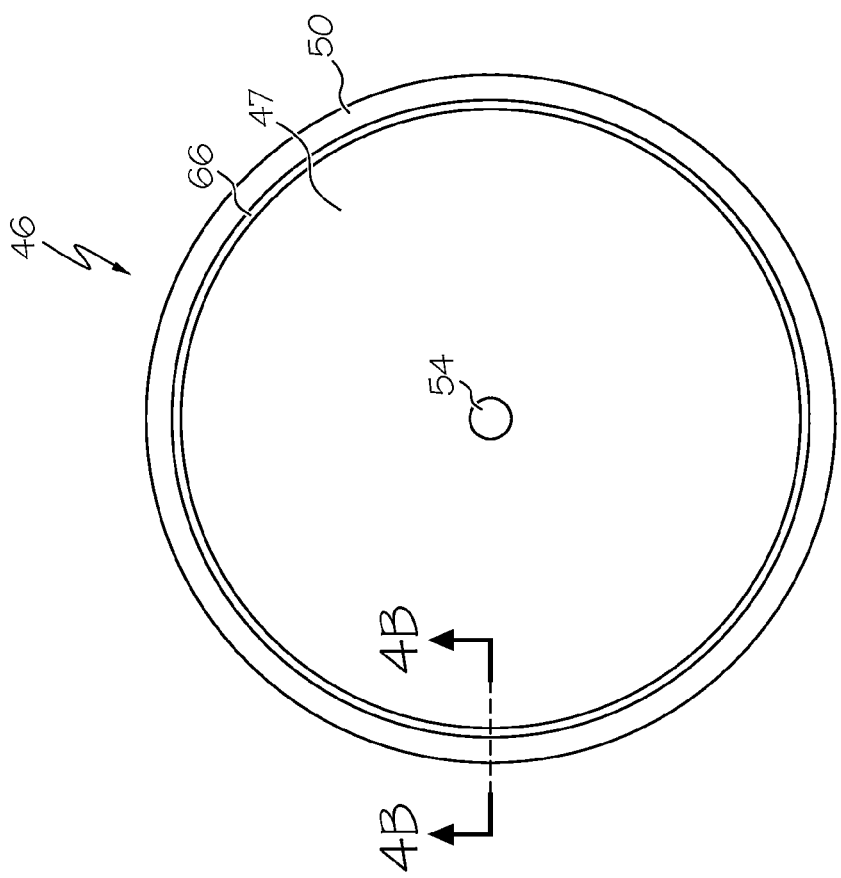
FIG. 4A is a plan view illustrating a shell member that forms a lower portion of the shell rotor assembly of FIG. 2.

FIG. 4A is a plan view illustrating second shell member 46. This view is taken from a perspective above second shell member 46 looking down. A laterally extending surface of second rim portion 50 and a laterally extending surface of second wall portion 47 are visible in this view. Also visible in this view is second alignment feature 66. In the illustrated embodiment, second alignment feature 66 comprises a notch in the upper surface of second rim portion 50 that extends around an entire circumference of second rim portion 50. With continuing reference to FIGS. 2, 3A, and 4A, second alignment feature 66 is configured to engage first alignment feature 64 such that first alignment feature 64 and second alignment feature 66 cooperate to concentrically align first shell member 44 with second shell member 46 when assembling shell assembly 42. It should be understood that while first alignment feature 64 and second alignment feature 66 have been depicted as a step and a notch, respectively, any other structure and/or configuration that is effective to assist alignment of first shell member 44 with second shell member 46 may also be used. Additionally, while first alignment feature 64 and second alignment feature 66 have been depicted as residing on an inner circumference of first and second rim portions 48 and 50, respectively, it should be understood that these features may be positioned elsewhere on first rim portion 48 and second rim portion 50.

FIG. 4B is a fragmentary cross sectional view taken along the line 4-4 of FIG. 4A. In this view, second alignment feature 66 can be seen as a notch that has been removed from an upper surface of second rim portion 50.

Figure 5:
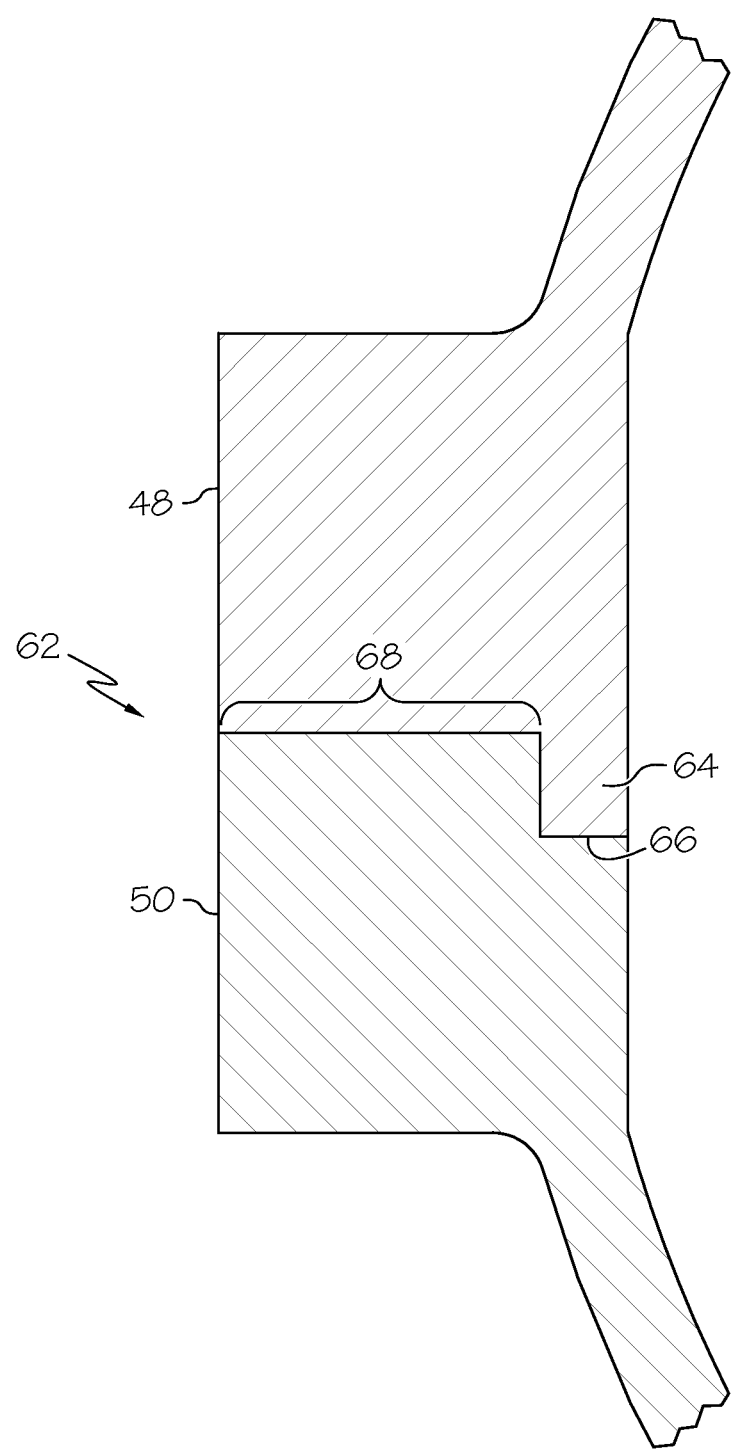
FIG. 5 is an expanded fragmentary cross sectional view illustrating a rim assembly formed when a first rim portion is attached to a second rim portion.

FIG. 5 is an expanded fragmentary cross sectional view illustrating rim assembly 62 formed when first rim portion 48 is attached to second rim portion 50. In this view, engagement between first alignment feature 64 and second alignment feature 66 is illustrated.

One way of attaching first rim portion 48 and second rim portion 50 is by a process known as electron beam welding. Electron beam welding is a fusion welding process in which a beam of high-velocity electrons is applied to the materials being joined. The work pieces melt as the kinetic energy of the electrons is transformed into heat upon impact, and material at the weld location melts to form the weld. This melted material is referred to as the heat-affected area. The welding is often done in conditions of a vacuum to prevent dispersion of the electron beam.

In the illustrated embodiment, a heat-affected area 68, formed by the process of electron beam welding, joins first rim portion to second rim portion 50. Heat-affected area 68 comprises only a portion of the lateral surfaces of first rim portion 48 and second rim portion 50. In other embodiments, a larger or smaller portion of the respective lateral surfaces of first and second rim portions 48 and 50 may be welded together. To limit the extent of the welding and ensure that the welded region does not extend completely through rim assembly 62, first alignment feature 64 serves as a backstop to limit the extent of the weld. Use of first alignment feature 64 for this purpose helps to ensure that the molten material created during the electron beam welding process does not exit rim assembly 62.

With continuing reference to FIGS. 2-5, the material used to fabricate shell rotor assembly 40 may be any suitable metal. In some embodiments, a high-strength, high-fracture-toughness structural alloy may be used in the construction of shell rotor assembly 40. Such materials may first be welded and then heat treated or otherwise processed. After such heat treatment, the heat-affected areas of the high-strength, high-fracture-toughness structural alloy are purported to have the same strength and resistance to fatigue as the material did prior to the weld. Such a material is disclosed in U.S. Pat. No. 5,087,415, which is hereby incorporated herein in its entirety by reference. One such high-strength, high-fracture-toughness structural alloy is sold under the trade name AerMet® 100 by Carpenter Technology Corporation of Reading, Pa.

Figure 6:
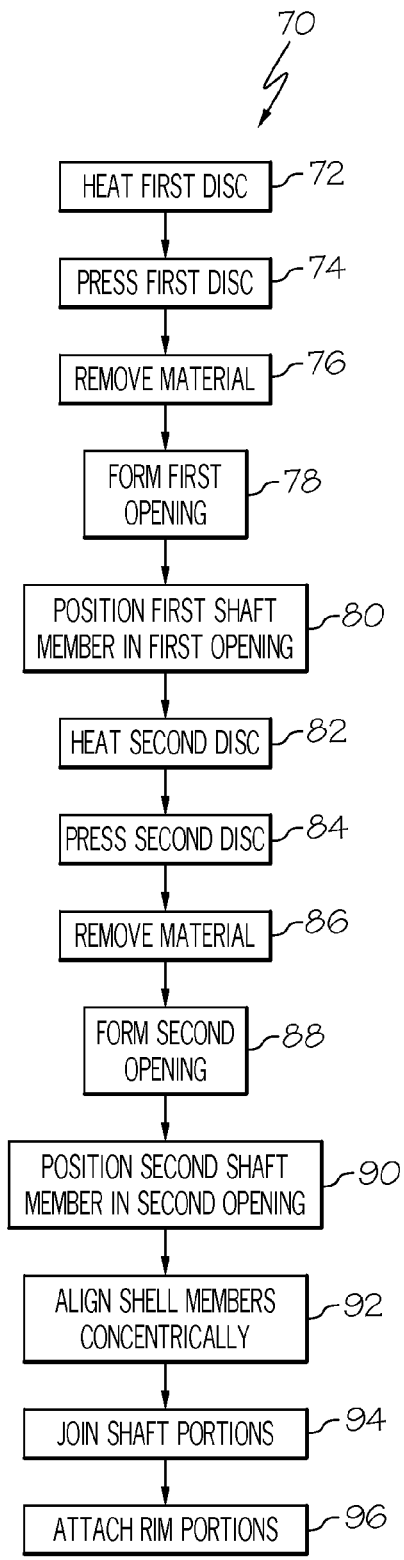
FIG. 6 is a block diagram illustrating an embodiment of a method for making a shell rotor assembly as taught herein for use in a control moment gyroscope.

FIG. 6 is a block diagram illustrating an embodiment of a method 70 for making a shell rotor assembly as taught herein for use in a control moment gyroscope. At block 72, a first metal disc is heated. The metal disc may be made of any desired metal material including, but not limited to, steel. The disc may have any desirable dimensions, such dimensions corresponding to the desired dimensions of the shell members to be used in construction of the shell rotor assembly. For example, the disc may have a circular configuration, a thirty inch diameter, and a two inch thickness.

Heating the disc may be accomplished in any suitable fashion including placing the metal disc in an oven or furnace, by exposing the metal disc to flame or to another source of high heat, or in any other suitable manner effective to raise the temperature of the metal disc to a desired temperature. In some embodiments, it may be desirable to heat the metal disc to a temperature of approximately 1,500 degrees Fahrenheit.

At block 74, the heated metal disc is placed in a tool and then pressed in any suitable manner to alter the shape of the metal disc so that at the end of the pressing step, the metal disc becomes a generally bowl-shaped member. This process is known as a hot forging process and the heated metal disc may need to be pressed only once or many times depending upon the temperature of the metal disc, the dimensions of the heated metal disc, and the specifications of the press used to press the metal disc. Once the heated metal disc has been transformed into a generally bowl-shaped member, it is removed from the press.

At block 76, the generally bowl-shaped member is placed in a tool and machined to remove undesired metal from its surface. Such machining may be accomplished, for example, through the use of computer numerically controlled machining as is well known in the art. This process will convert the uniformly thick, generally bowl-shaped member into a shell member having a relatively thin wall portion and a relatively thick rim portion. At this step, an alignment feature such as a step or notch may be formed on the rim portion.

At block 78, an opening at the center of the shell member is formed to accommodate a shaft assembly. At block 80, a shaft member is positioned in the opening. At this stage, one of two shell members has been completely constructed and is ready for assembly to a second shell member.

At block 82, the process of constructing the second shell member begins. As discussed above with respect to block 72, a metal disc is heated. At block 84, the heated metal disc is pressed into a generally bowl-shaped member. At block 86, material is removed from the generally bowl-shaped member to form the second shell member having a wall portion and a rim portion having a second alignment feature. At block 88, a second opening is formed in the second shell member and at block 90 a second shaft member is positioned in the second opening.

At block 92, the two shell members are concentrically aligned with respect to one another. Such concentric alignment may be accomplished through engagement between complementary alignment features positioned on the rim portions of the two shell members.

At block 94, the shaft members are joined to one another and at block 94, the rim portions are joined to one another. The shaft members and the rim portions may be joined via an electron beam welding process, as discussed above. Additionally, in some embodiments, the joining of the shaft members to one another may be accomplished simultaneously with the joining of the rim portions to one another.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A shell rotor assembly for use in a control moment gyroscope, the shell rotor assembly comprising:
   a first shell member having a first wall portion and a first rim portion formed integrally in one piece;
   a second shell member having a second wall portion and a second rim portion formed integrally in one piece; and
   a shaft assembly disposed at an approximate center of the shell rotor assembly and extending between the first shell member and second shell member;
   wherein the first rim portion is attached to the second rim portion by an electron beam welding process, whereby a heat-affected area, formed by the electron beam welding process, joins the first rim portion to the second rim portion, the heat-affected area is located over only a portion of lateral surfaces of the first rim portion and the second rim portion wherein the lateral surfaces are configured in a direction which is perpendicular to the shaft assembly wherein the first rim portion includes a first alignment feature and wherein the second rim portion includes a second alignment feature configured to engage the first alignment feature whereby the first shell member and the second shell member are arranged concentrically with one another as a result of engagement between the first alignment feature and the second alignment feature wherein the first alignment feature serves as a backstop to limit the extent of the electron beam welding process.

2. The shell rotor assembly of claim 1, wherein the first shell member and the second shell member are each substantially bowl-shaped.

3. The shell rotor assembly of claim 1, wherein the first shell member and the second shell member comprise a high-strength, high-fracture-toughness structural alloy.

\* \* \* \* \*